(12) United States Patent
Knupfer et al.

(10) Patent No.: US 11,703,144 B2
(45) Date of Patent: Jul. 18, 2023

(54) MOTOR-DRIVEN AXIAL-FLOW CONTROL VALVE

(71) Applicant: OBLAMATIK AG, Chur (CH)

(72) Inventors: Daniel Knupfer, Trimmis (CH); Thomas Knupfer, Chur (CH); Roland Obrist, Scharans (CH)

(73) Assignee: OBLAMATIK AG, Chur (CH)

( * ) Notice: Subject to any disclaimer, the term of this patent is extended or adjusted under 35 U.S.C. 154(b) by 0 days.

(21) Appl. No.: 17/269,505

(22) PCT Filed: Sep. 19, 2018

(86) PCT No.: PCT/EP2018/075352
§ 371 (c)(1),
(2) Date: Feb. 18, 2021

(87) PCT Pub. No.: WO2020/057736
PCT Pub. Date: Mar. 26, 2020

(65) Prior Publication Data
US 2021/0199213 A1 Jul. 1, 2021

(51) Int. Cl.
*F16K 37/00* (2006.01)
*F16K 3/08* (2006.01)
(Continued)

(52) U.S. Cl.
CPC ............ *F16K 37/005* (2013.01); *F16K 3/085* (2013.01); *F16K 27/045* (2013.01); *F16K 31/043* (2013.01)

(58) Field of Classification Search
CPC .. F16K 37/005; F16K 31/043; F16K 31/0668; F16K 27/045
See application file for complete search history.

(56) References Cited

U.S. PATENT DOCUMENTS 4,596,377 A    6/1986  Taylor
4,901,977 A *  2/1990  Hendrick ............... F16K 31/53
                                                         251/249.5
(Continued)

FOREIGN PATENT DOCUMENTS

DE   202016106030 U1   1/2018
EP       1767840 B1   11/2009
(Continued)

OTHER PUBLICATIONS

International Search Report for corresponding PCT application No. PCT/EP2018/075352, dated Jun. 3, 2019.

*Primary Examiner* — Atif H Chaudry
(74) *Attorney, Agent, or Firm* — Notaro, Michalos & Zaccaria P.C.

(57) ABSTRACT

A motor-driven axial-flow control valve is disclosed that has a valve body with an inlet and an opposite outlet and a passage located between having a substantially axial alignment relative to the inlet and outlet, and a flow control path arranged in the passage with an operative connection to a motor drive in a switch housing resting on the valve body. The flow control valve is formed by two radially arranged discs lying on one another and each having at least one passage opening where one disc is a stator disc permanently arranged in the valve body, and the other disc lies axially rotatably on the stator disk, and the rotatable disc is in engagement with an axially rotatable sleeve that is arranged axially in the passage and through which flow can pass in the cavity of the rotatable disc.

14 Claims, 3 Drawing Sheets

Figure 1:
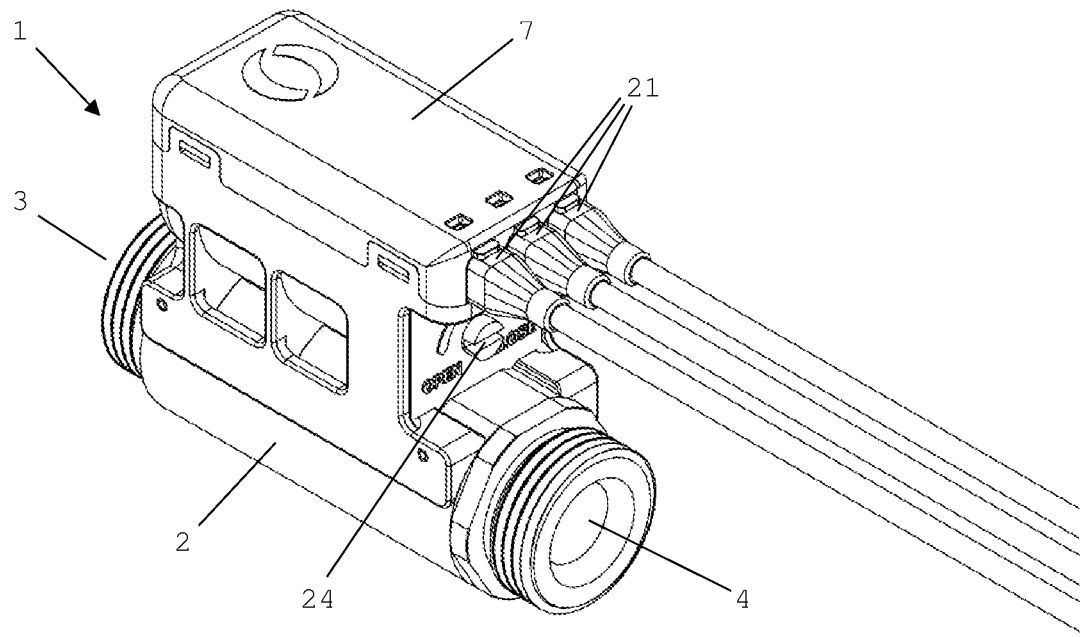

(51) Int. Cl.
*F16K 27/04* (2006.01)
*F16K 31/04* (2006.01)

(56) References Cited

U.S. PATENT DOCUMENTS

| | | | |
|---|---|---|---|
| 5,066,062 A * | 11/1991 | Sekulovski | B60K 15/05 |
| | | | 296/97.22 |
| 10,036,480 B2 | 7/2018 | Hoff et al. | |
| 2010/0199433 A1* | 8/2010 | Clenet | A61G 7/0521 |
| | | | 5/618 |
| 2011/0178644 A1* | 7/2011 | Picton | E03B 7/071 |
| | | | 700/282 |
| 2016/0356026 A1 | 12/2016 | Engler | |
| 2017/0370492 A1* | 12/2017 | Obrist | F16K 5/04 |
| 2017/0370754 A1 | 12/2017 | Croteau | |
| 2019/0072200 A1* | 3/2019 | Chen | F16K 31/041 |

FOREIGN PATENT DOCUMENTS

| | | |
|---|---|---|
| EP | 2391839 B1 | 9/2014 |
| WO | 2016131472 A1 | 8/2016 |

\* cited by examiner

MOTOR-DRIVEN AXIAL-FLOW CONTROL VALVE

The present invention relates to a motor-driven axial flow control valve. In the context of the present invention, "axial" is to be understood to mean that the flow direction of a fluid flowing through the flow control valve in question runs mainly rectilinearly and without any significant deflection in the axis between two opposite connections, that is to say an inlet and an outlet. In addition, the axial flow control valve is motor-driven, that is to say is adjustable in terms of its flow rate by way of a motor drive acting on a control part.

It should be noted at this point that the term "control valve" also encompasses regulating valves, and a control part may also be a regulating part. Whether a valve is used to regulate to a particular target value of a parameter or whether control (adjustment) takes place merely through the opening width thereof depends primarily on the system in which the valve is incorporated.

A motor-driven axial flow control valve of the generic type is described in EP 2 391 839 B1. Said valve comprises a valve housing having a passage between an inlet and an outlet and having a flow control part, wherein the flow path is oriented substantially axially, and wherein in said document the motor drive is located internally in the flow control part. A valve stem in the flow control part can be moved axially by the motor drive and thus the flow rate in a valve seat can be varied.

Another embodiment of a motor-driven axial flow control valve is described in U.S. Pat. No. 10,036,480 B2. In said document, the motor drive for a valve piston which is displaceable in an axial cage is arranged on the outside of the valve housing. The motor drive acts via a rotatable or linear transverse spindle on the stem of the axially displaceable valve piston by means of a rack-and-pinion mechanism or an articulation.

The embodiments of motor-driven axial flow control valves which are known from the prior art are complicated in their interior structure and on the drive side and are not very compact in their design as a whole.

The object of the present invention is to provide an alternative motor-driven axial flow control valve.

This object is achieved by a motor-driven axial flow control valve having the features of claim 1.

The present invention additionally relates to uses of a motor-driven axial flow control valve according to the invention.

Preferred embodiments and variants according to the invention can be found in the respective dependent claims.

A motor-driven axial flow control valve according to the present invention comprises a valve body having an inlet and an opposite outlet and a passage located therebetween with a substantially axial orientation relative to the inlet and to the outlet, and a flow control part which is arranged in the passage and which is operatively connected to a motor drive in a switch housing bearing against the valve body, wherein the flow control part is formed by two radially arranged discs which lie on one another and which each have at least one through-opening, of which one disc is a stator disc fixedly arranged in the valve body and the other disc lies on the stator disc in an axially rotatable manner, and the rotatable disc is in engagement with an axially rotatable sleeve which is arranged axially in the passage and through which flow can pass in the cavity thereof, wherein said sleeve is operatively connected at its outer circumference to the motor drive.

The expression "bearing against" in relation to the switch housing means that the switch housing is mechanically fixedly connected to the valve body, in a detachable or non-detachable manner, for example by a screw fastening, or that it is integrally formed thereon or is made in one piece together with the valve body.

Flow control valves having a motor-actuated rotor disc in collaboration with a stator disc are known, for example from EP 1 767 840 B1 or from WO 2016/131472 A1. However, in said valve constructions, the drive takes place via a spindle, which for space reasons requires that the outflow of water from the flow control part must be deflected through 90 degrees. Firstly this increases the flow resistance, and secondly a stagnating space is created on the rear side facing away from the outflow, which makes it necessary to provide an additional, rearward-facing window in the cartridge wall for flushing through without any dead space.

In contrast to this, the motor-driven axial flow control valve according to the invention is more compact due to its novel drive design and enables a largely rectilinear axial flow without stagnating zones. Due to this flow-optimized design, which causes less pressure loss, high maximum flow rates are possible with the flow control valve according to the invention ("high flow"). In addition, less noise occurs in the flow control valve according to the invention due to the rectilinear flow.

An operative connection between the motor drive and the outer circumference of the axially rotatable sleeve can be achieved in various ways in the present invention. For example, a worm gear would be conceivable.

The motor drive of the motor-driven axial flow control valve according to the invention preferably comprises an electric motor with a transmission and a drive shaft, on which a drive wheel is seated, said drive wheel being operatively connected to the outer circumference of the axially rotatable sleeve.

The drive shaft is preferably oriented axis-parallel to the axially rotatable sleeve. For example, a belt drive comprising a flat belt or V-belt would be possible between the drive wheel and the outer circumference of the axially rotatable sleeve.

In one embodiment, the drive wheel is configured as a toothed wheel, and the axially rotatable sleeve has a toothing on its outer circumference. Inter alia, a chain drive would be possible according to this basic principle.

Preferably, the drive wheel configured as a toothed wheel engages in the toothing on the outer circumference of the axially rotatable sleeve and is thus operatively connected to the axially rotatable sleeve.

In another embodiment, the toothing on the outer circumference of the axially rotatable sleeve is operatively connected to the drive wheel configured as a toothed wheel by means of a toothed belt.

The electric motor of the motor-driven axial flow control valve is preferably a stepper motor or a DC motor.

In the motor-driven axial flow control valve according to the invention, at least one of the two radially arranged discs preferably comprises a material selected from the group consisting of ceramic, metal and engineering plastic. Preferably, said at least one disc is made of such a material, for example of ceramic.

Metals are to be understood to mean both pure metals and also metal alloys. A disc made of metal could additionally be surface-coated. On the other hand, a suitable engineering plastic must be characterized by good technical properties such as high strength, dimensional stability, thermostability, wear resistance and good sliding properties. Such plastics are usually reinforced with additives. Suitable polymers include, for example, high-temperature polyamides.

In the motor-driven axial flow control valve according to the present invention, the axially rotatable sleeve in the valve body is preferably provided with seals on its outer circumference. These are preferably mechanical seals for good rotational mobility. Said seals serve the purpose of sealing off the interior of the valve body in relation to the drive side on the outer circumference of the axially rotatable sleeve.

Instead of being sealed directly against the inner wall of the valve body, the axially rotatable sleeve may optionally also be sealed against a tightly fitted sleeve in the valve body. The axially rotatable sleeve and the two discs of the flow control part may be accommodated in such a tightly fitted sleeve. A tightly fitted sleeve must have a cutout at the location of the operative drive connection.

Due to the sealing, it is advantageous in the motor-driven axial flow control valve according to the invention if the inlet is on the stator disc side and the outlet is on the axially rotatable sleeve side. In this way, the seals of the axially rotatable sleeve are exposed to less high pressure. In principle, however, the valve may also be operated in the reverse direction of flow (with the inlet and outlet swapped).

In the motor-driven axial flow control valve, in preferred embodiments according to the present invention, at least one sensor is installed in the valve body. This makes it possible to carry out measurements during operation and to evaluate the captured data.

The at least one sensor is in particular selected from the group consisting of flow sensors, temperature sensors, pressure sensors and hygiene sensors. Preferably a turbine flow meter is selected as the flow sensor. Hygiene sensors are to be understood to mean chose sensors that measure (for example physically and/or chemically and/or biochemically) properties relating to water quality.

In the motor-driven axial flow control valve according to the invention, flow sensors and/or temperature sensors are preferably installed at the inlet and pressure sensors and/or hygiene sensors are preferably installed at the outlet of the valve body.

Preferably, interface connections for supplying electrical power and for actuating the motor drive and also for capturing measurement signals from sensors and for transmitting data are present on the switch housing of the motor-driven axial flow control valve according to the invention. Such interface connections are preferably connected to a monitoring unit for control and data evaluation purposes.

Said monitoring unit may be placed outside of the switch housing, for example in a control cabinet or in a control room. However, it is also possible to integrate the monitoring unit on a printed circuit board (abbreviation PCB) as internal measurement and control electronics in the switch housing of the axial flow control valve according to the invention, said printed circuit board also comprising the interface connections.

The invention also includes uses of the motor-driven axial flow control valve according to the invention for fluids in general, that is to say for liquids, vapours and gases. Preferred uses are in the water supply (potable water, non-potable water, hot water), in sanitary facilities or in heating and cooling systems of buildings, in particular as a control valve, as a flow regulating valve, as a water meter, as a circulation valve, or as a safety shut-off valve, the latter on a house or storey water connection with monitoring by a monitoring unit for incidents such as unusual water consumption or possible leaks. For the latter use, the motor-driven axial flow control valve may have a pressure sensor at the outlet in addition to a flow sensor at the inlet. In addition, when an incident occurs, a message can be transmitted from the monitoring unit to a control centre or to a user's app, for example to a user's smartphone. In the event of a leak, the water connection can be shut off by automatic closure of the motor-driven axial flow control valve.

Figure 2:
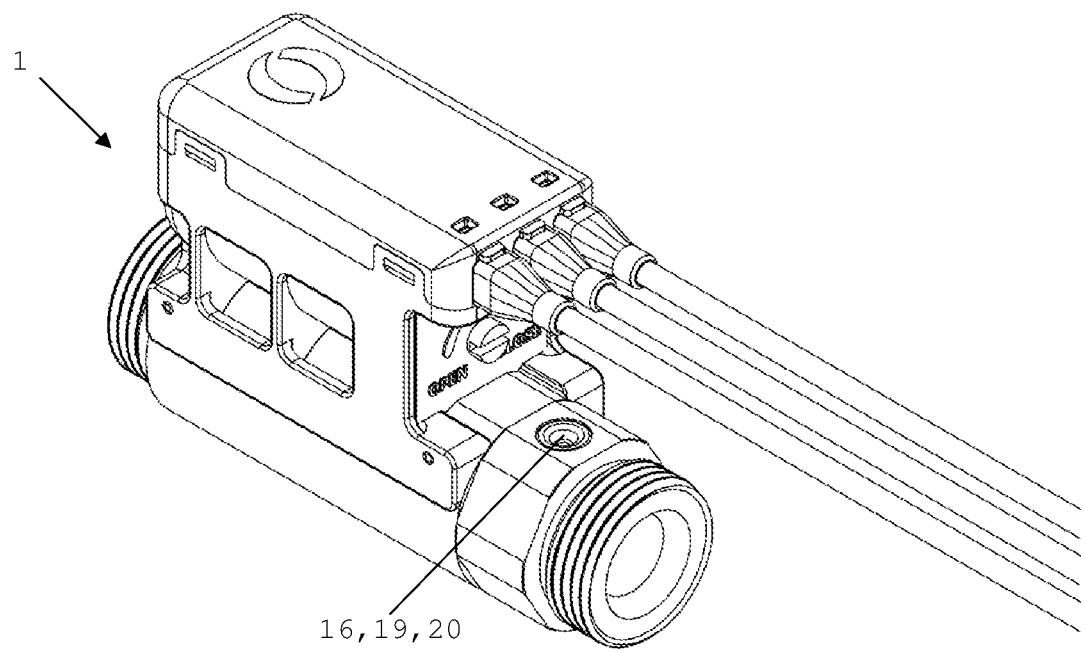
Figure 3:
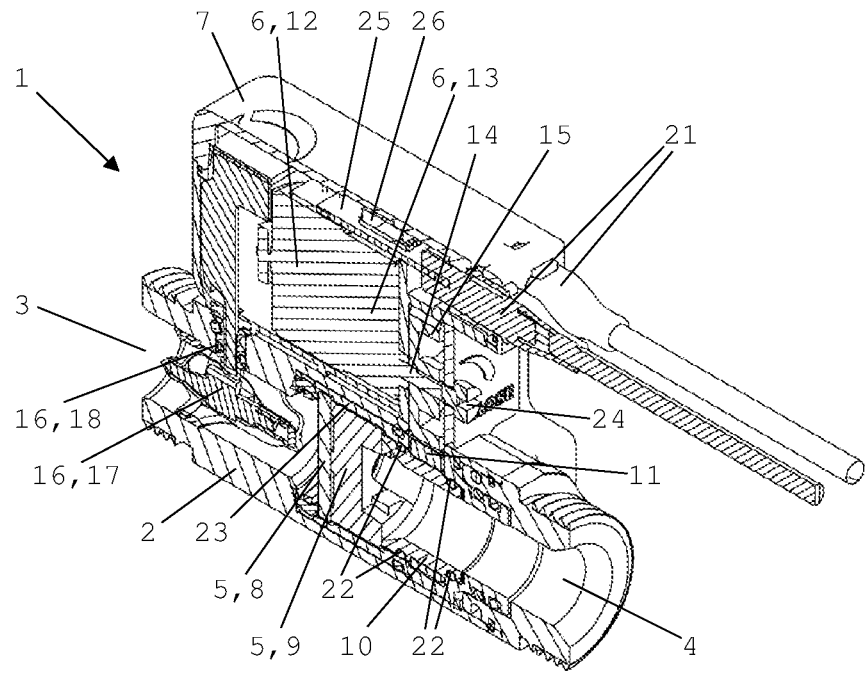
Figure 4:
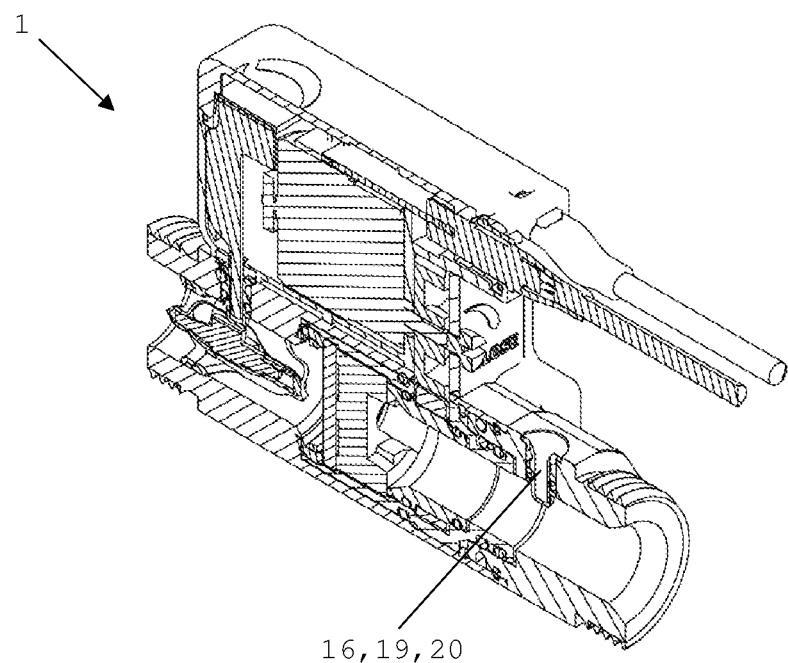
Figure 5:
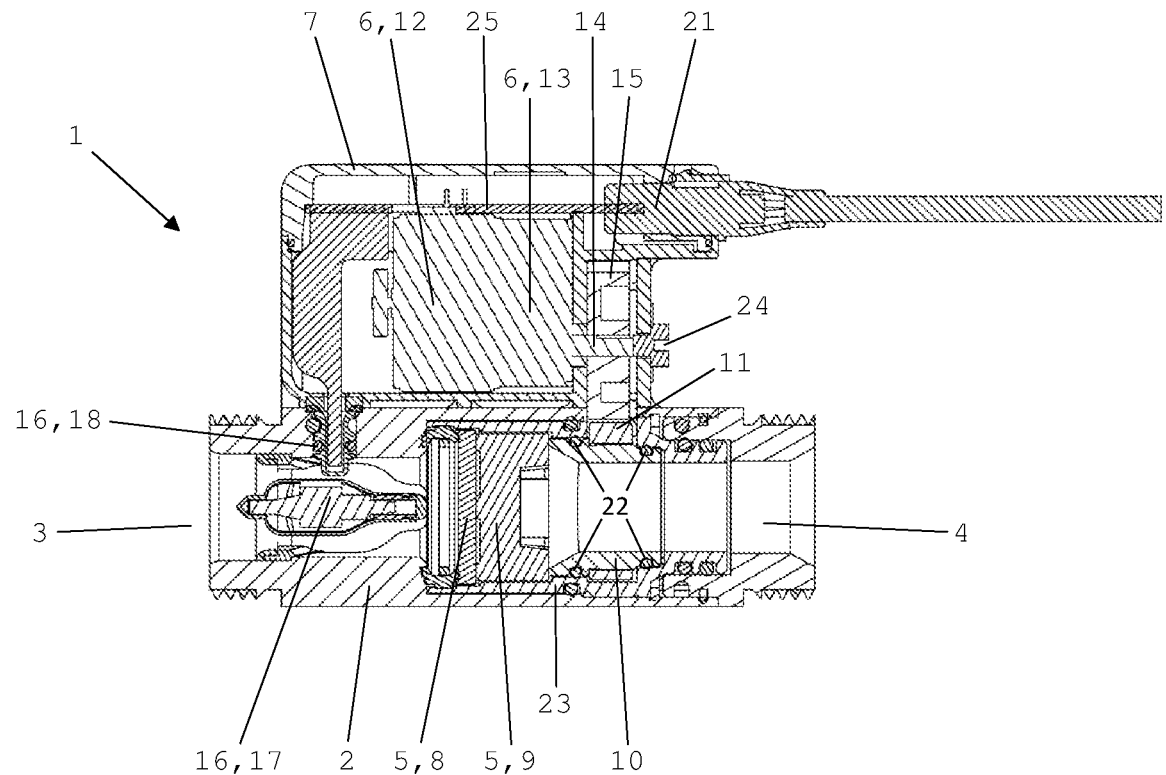
Figure 6:
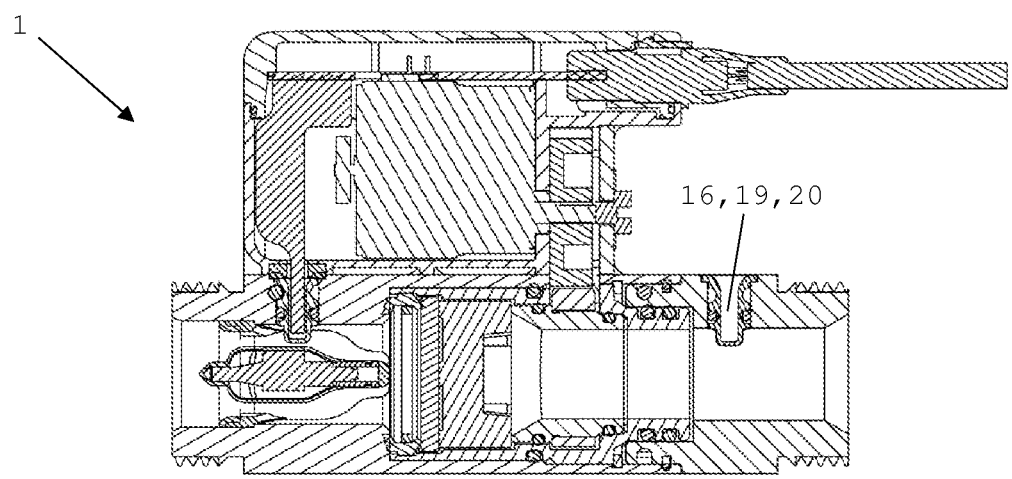

The invention will be explained in greater detail below with reference to schematic figures which show exemplary embodiments that do not limit the scope of the present invention in the figures:

FIG. 1 shows a motor-driven axial flow control valve according to the invention in a 3D exterior view, FIG. 2 shows a motor-driven axial flow control valve according to the invention in a 3D exterior view with an additional sensor installation location, FIG. 3 shows a motor-driven axial flow control valve according to the invention in an axially sectioned 3D view, FIG. 4 shows a motor-driven axial flow control valve according to the invention in an axially sectioned 3D view with an additional sensor installation location, FIG. 5 shows a motor-driven axial flow control valve according to the invention in an axial longitudinal section, FIG. 6 shows a motor-driven axial flow control valve according to the invention in an axial longitudinal section with an additional sensor installation location.

FIG. 1 shows an exterior view of a motor-driven axial flow control valve 1 according to the invention in a perspective three-dimensional illustration. From outside, it is possible to see the valve body 2, the inlet 3 thereof, and the outlet 4 located opposite the inlet 3, as well as the switch housing 7 bearing against the valve body 2. The substantially axially oriented passage between the inlet 3 and the outlet 4 is located in the valve body 2. It is also possible to see a mechanical position indicator 24 as well as interface connections 21 with plugged-in cables, of which one serves for supplying electrical power and for actuating the motor drive, a second leads to an external monitoring unit (not shown) for the purpose of transmitting measurement data, and connected to the third may be an additional external sensor (for example temperature of a circulation water circuit) or a sensor from the additional sensor installation location in the valve (cf. explanations relating to FIG. 2). For operation as a pure control valve, one cable would suffice for supplying electrical power and for actuating the motor drive. In the case of additional data transmission, it is possible to install, in place of a wired interface (for example LAN), also a wirelessly functioning module such as WLAN or Bluetooth® in order to enable wireless communication via such an interface.

FIG. 2 corresponds to FIG. 1, with the difference that the motor-driven axial flow control valve 1 in FIG. 2 has an additional sensor installation location 16, 19, 20 which is suitable for a pressure sensor 19 and/or a hygiene sensor 20 or further sensors 16. The other components correspond to FIG. 1 and are therefore not labelled again in FIG. 2.

FIG. 3 is comparable to FIG. 1 and shows a motor-driven axial flow control valve 1 in an axially sectioned, three-dimensional illustration. In addition to the components already explained in relation to FIG. 1, the following features, which are essential to the invention or preferred, can be seen in the cut-open interior:

A flow control part 5, formed by two radially arranged discs 8, 9 which lie on one another and which each have at least one through-opening, namely a stator disc 8 fixedly arranged in the valve body 2 and an axially rotatable disc 9.

By way of a rotational movement, the degree of overlap of the respective at least one through-opening of the two discs is adjusted between a closed and a fully open position depending on the angle, and thus the opening width of the valve or the free flow cross-section is varied. The rotatable disc 9 is in engagement with an axially rotatable sleeve 10 which is arranged axially in the passage and through which flow can pass in the cavity thereof, and thus rotates simultaneously with said sleeve in a mechanically coupled manner. In the preferred embodiment shown, the sleeve 10 has a toothing 11 on its outer circumference, which toothing is operatively connected to the motor drive 6 on the outside of the valve body 2. The motor drive 6 preferably comprises an electric motor 12 with a transmission 13. In the drawing, the transmission 13 is located in the hatched region of the motor drive 6 in the zone with the somewhat smaller diameter. Leading out from the transmission 13 is a drive shaft 14, on which a drive wheel 15 is mounted. The latter is configured here as a toothed wheel and engages in the toothing 11 on the outer circumference of the axially rotatable sleeve 10, and is in this way operatively connected. In the example shown, a mechanical position indicator 24, which is visible from outside, is mounted on the end face of the drive shaft 14. In addition to the electronic data from the actuation of the motor drive 6, the valve position can be indirectly read here.

To prevent fluids or liquid from escaping from the passage in the valve body 2 into the space at the drive wheel 15, the axially rotatable sleeve 10 in the valve body 2 is preferably provided with seals 22 on its outer circumference as shown. Said seals are ring-shaped and are preferably mechanical seals. As shown, in this embodiment of the motor-driven axial flow control valve 1 according co the invention, the axially rotatable sleeve 10 is not sealed directly against the inner wall of the valve body 2, but instead against a sleeve 23 which is tightly fitted into the valve body 2 and in which the two discs 8, 9 of the flow control part 5 are accommodated along with the axially rotatable sleeve 10.

Also shown in FIG. 3 are optional sensors 16, namely a temperature sensor 16, 18 and a flow sensor 16, 17. The flow sensor 17 is preferably a turbine flow meter, as shown. The rotational speed thereof is preferably recorded by a built-in Hall element (Hail-effect sensor).

Also labelled in FIG. 3 is a printed circuit board 25. The abbreviation PCB for a printed circuit board is well known. The printed circuit board 25 is arranged in the switch housing 7 and comprises the electronics internal to the valve. Said electronics also include the electrical contacts on the printed circuit board 25 for the interface connections 21, as well as connection points from the underside of the printed circuit board 25 on the far left in the figure down to the temperature sensor 16, 18 and a Hall element projecting down to the flow sensor 16, 17. In addition, an optional display 26 arranged on the printed circuit board 25 is visible only in FIG. 3. Said display 26 may comprise an LED operating display and/or a display for displaying information in short form. In order to be able to read the display 26, the cover of the switch housing 7 would be made at least semi-transparent or transparent at least at the location in question.

FIG. 4 corresponds to FIG. 3, with the difference that the motor-driven axial flow control valve 1 in FIG. 4 shows an additional sensor installation location 16, 19, 20 (analogous to FIG. 2) which is suitable for example for a pressure sensor 19 and/or a hygiene sensor 20. The other details correspond to FIG. 3 and are therefore not labelled again in FIG. 4.

FIG. 5 corresponds to FIG. 3, but an axial longitudinal section is shown in FIG. 5. Certain details can be seen even more clearly in the longitudinal section. The explanations relating to the individual features correspond to those of FIG. 3.

FIG. 6 corresponds to FIG. 5, with the difference that the motor-driven axial flow control valve 1 in FIG. 6 shows an additional sensor installation location 16, 19, 20 (analogous to FIGS. 2 and 4) which is suitable for example for a pressure sensor 19 and/or a hygiene sensor 20. The other details correspond to FIG. 5 and are therefore not labelled again in FIG. 6.

An additional pressure sensor 19 could be inserted in connection with the possible use of a motor-driven axial flow control valve according to the invention for leakage monitoring. Furthermore, in addition to the sensors installed in the axial flow control valve according to the invention, separate moisture sensors could also be used for leakage monitoring and could be connected to said monitoring unit and/or connected to an interface connection 21.

It should be noted at this point that any combinations of the features described and/or shown in the figures belong to the scope of the present invention, as long as the combinations are not inconsistent.

As can be seen from the description and from the explanations relating to the figures, the present invention provides an advantageous and versatile alternative solution for a motor-driven axial flow control valve.

LIST OF REFERENCE SIGNS

Identical reference signs in the figures indicate corresponding features, even if reference is not expressly made thereto in each case in the description of the individual figures.

1 motor-driven axial flow control valve
2 valve body
3 inlet
4 outlet
5 flow control part
6 motor drive
7 switch housing
8 stator disc of the flow control part 5
9 rotatable disc of the flow control part 5
10 axially rotatable sleeve
11 toothing on the outer circumference of the axially rotatable sleeve 10
12 electric motor of the motor drive 6
13 transmission of the motor drive 6
14 drive shaft of the transmission 13
15 drive wheel on the drive shaft 14
16 sensor
17 flow sensor
18 temperature sensor
19 pressure sensor
20 hygiene sensor
21 interface connection
22 seal, mechanical seal
23 tightly fitted sleeve in the valve body 2
24 mechanical position indicator on the drive shaft 14
25 printed circuit board
26 display on the printed circuit board 25

The invention claimed is:

1. A motor-driven axial flow control valve (1), comprising:
  a valve body (2) having an inlet (3) and an opposite outlet (4) and a passage located therebetween with a substantially axial orientation relative to the inlet (3) and to the outlet (4), and a flow control part (5) which is arranged in the passage and which is operatively connected to a motor drive (6) in a switch housing (7) bearing against the valve body (2), wherein the flow control part (5) is formed by two radially arranged discs (8, 9) which lie on one another and which each have at least one through-opening, of which one disc is a stator disc (8) fixedly arranged in the valve body (2) and the other disc (9) lies on the stator disc (8) in an axially rotatable manner, and the rotatable disc (9) is in engagement with an axially rotatable sleeve (10) which is arranged axially in the passage and through which flow can pass in the cavity thereof, wherein said sleeve (10) is operatively connected at its outer circumference to the motor drive (6), wherein the motor drive (6) comprises an electric motor (12) with a transmission (13) and a drive shaft (14), and a drive wheel (15) is seated on the drive shaft (14), said drive wheel being operatively connected to the outer circumference of the axially rotatable sleeve (10), wherein in the axial orientation the electric motor (12) the transmission (13) and the drive wheel (15) are arranged next to each other in a line, wherein the drive wheel (15) is configured as a toothed wheel, and wherein the axially rotatable sleeve (10) has a toothing (11) on its outer circumference, and in that the drive wheel (15) engages in said toothing (11) of the axially rotatable sleeve (10).

2. The motor-driven axial flow control valve (1) according to claim 1, characterized in that the electric motor (12) is a stepper motor or a DC, motor.

3. The motor-driven axial flow control valve (1) according to claim 1, characterized in that at least one of the two radially arranged discs (8, 9) comprises a material selected from the group consisting of ceramic, metal and engineering plastic.

4. The motor-driven axial flow control valve (1) according to claim 1, characterized in that the axially rotatable sleeve (10) in the valve body (2) is provided with seals (22) on its outer circumference.

5. The motor-driven axial flow control valve (1) according to claim 1, characterized in that the inlet (3) is on the stator disc (8) side and the outlet (4) is on the axially rotatable sleeve (10) side.

6. The motor-driven axial flow control valve (1) according to claim 1, characterized in that at least one sensor (16) is installed in the valve body (2).

7. The motor-driven axial flow control valve (1) according to claim 6, characterized in that the at least one sensor (16) is selected from the group consisting of flow sensors (17), temperature sensors (18), pressure sensors (19) and hygiene sensors (20).

8. The motor-driven axial flow control valve (1) according to claim 7, characterized in that a turbine flow meter is selected as the flow sensor (17).

9. The motor-driven axial flow control valve (1) according to claim 7, characterized in that flow sensors (17) and/or temperature sensors (18) are installed at the inlet (3) and pressure sensors (19) and/or hygiene sensors (20) are installed at the outlet (4) of the valve body (2).

10. The motor-driven axial flow control valve (1) according to claim 1, characterized in that interface connections (21) for supplying electrical power and for actuating the motor drive (6) and also for capturing measurement signals from sensors (16) and for transmitting data are present on the switch housing (7) of the motor-driven axial flow control valve (1).

11. The motor-driven axial flow control valve (1) according to claim 10, characterized in that the interface connections (21) are connected to a monitoring unit for control and data evaluation purposes.

12. A method for use, comprising the step of providing the motor-driven axial flow control valve (1) according to claim 1 in a context selected from the group consisting of a water supply, a sanitary facility, a heating system of building and a cooling system of a building, wherein the motor-driven axial flow control valve (1) is employed in the function selected from the group consisting of: a control valve, a flow regulating valve, a water meter, a circulation valve, and a safety shut-off valve, wherein when the motor-driven axial flow control valve (1) is employed as a safety shut-off valve, it is employed on a house or storey water connection with monitoring by a monitoring unit for incidents selected from the group consisting of unusual water consumption and possible leaks.

13. The method according to claim 12, characterized in that, for monitoring for incidents selected from the group consisting of unusual water consumption and possible leaks, the motor-driven axial flow control valve (1) comprises a flow sensor (17) at the inlet (3) and a pressure sensor (19) at the outlet (4).

14. The method according to claim 12, characterized in that, when an incident occurs, a message is transmitted from the monitoring unit to a control centre or to a user's app, and in the event of a leak the water connection is shut off by automatic closure of the motor-driven axial flow control valve (1).

* * * * *